United States Patent
Wozny

[11] Patent Number: 5,849,836
[45] Date of Patent: Dec. 15, 1998

[54] COAGULATION OF POLYMERS USING SULFUROUS ACID

[75] Inventor: John C. Wozny, Coolville, Ohio

[73] Assignee: General Electric Company, Pittsfield, Mass.

[21] Appl. No.: 665,111

[22] Filed: Jun. 14, 1996

Related U.S. Application Data

[63] Continuation of Ser. No. 327,084, Oct. 21, 1994, abandoned.

[51] Int. Cl.⁶ .................................................. C08K 7/00
[52] U.S. Cl. ........................... 524/525; 515/310; 515/311
[58] Field of Search ............................ 524/535; 525/310, 525/311

[56] References Cited

U.S. PATENT DOCUMENTS

| | | | |
|---|---|---|---|
| 4,487,857 | 12/1984 | Sugimori et al. | 523/335 |
| 4,602,064 | 7/1986 | Moore et al. | 525/310 |
| 4,783,508 | 11/1988 | Moore et al. | 525/310 |

FOREIGN PATENT DOCUMENTS

| | | |
|---|---|---|
| 56-141303 | 11/1981 | Japan . |
| 56141303 | 11/1981 | Japan . |

OTHER PUBLICATIONS

Homogeneous and Heterogeneous Copolymerization of Styrene and Sulfur Dioxide using the $(CH_3)_3COOH/SO_2$ Redox System, Journal of Applied Polymer Science, vol. 37, 3163–3176 (1989), SK. A. Ali, C.P. Tsonis and M.I.M. Wazeer.

*Primary Examiner*—Bernard Lipman

[57] ABSTRACT

Methods for coagulating a graft polymer latex comprise contacting the latex with sulfurous acid. The methods are particularly suitable for ABS resins and provide products having improved thermal oxidative stability and color stability. When coagulation is effected in the presence of a radical initiator, the residual grafting monomer concentration in the resin product is reduced.

9 Claims, No Drawings

COAGULATION OF POLYMERS USING SULFUROUS ACID

The present application is a continuation of U.S. application Ser. No. 08/327,084, filed Oct. 21, 1994 for "COAGULATION OF POLYMERS USING SULFUROUS ACID" by John C. Wozny, now abandoned.

FIELD OF THE INVENTION

The present invention relates to methods for coagulating a latex of a graft polymer such as ABS, and to the graft polymers resulting from such methods. The resulting graft polymers exhibit improved thermal and color stability and reduced residual grafting monomer content.

BACKGROUND OF THE INVENTION

Graft polymers such as ABS are well known in the polymer industry, as are methods for their preparation, and are advantageous for use in various applications. Generally, the ABS graft polymers contain a rubber substrate or backbone portion formed of a conjugated diene such a butadiene, and a grafted portion. The grafted portion is typically formed of one or more rigid polymer forming monomers including, for example, monovinyl aromatic monomers such as styrene and substituted styrenes, acrylic monomers such as acrylonitrile, alkyl acrylates and alkyl methacrylates, and ethylinically unsaturated dicarboxylic acids and derivatives thereof such as maleic anhydride, maleimide and substituted maleimides.

Numerous methods are known in the art for controlling the starting monomers and/or reaction conditions in order to optimize one or more properties of such ABS polymers and/or for improving the overall properties of polymer blend compositions in which the ABS copolymers are employed. For example, the Moore et al U.S. Pat. No. 4,783,508 discloses an emulsion polymerization process for preparing a rubber substrate for use in graft copolymers wherein the rubber substrate particles are disclosed as containing an improved quantity and size of occluded matrix polymer, thereby resulting in an improved rubber phase volume without substantial loss in modulus. In the Moore et al process, the rubbery polymer is contacted with at least one addition polymerizable graft producing monomer under conditions such that the rubber emulsion particles imbibe the monomer but substantially no monomer polymerization occurs, after which free radical polymerization of the monomer is initiated. Additionally, the Moore et al U.S. Pat. No. 4,602,064 discloses a multistep process for forming a rubber particle core onto which a uniform layer of polymer is grafted.

Many of the methods which are employed in the production of graft polymers in order to control properties of the polymers are disadvantageous in that they require a number of process steps and close process control. Accordingly, there is a continuing need for improved methods for preparing graft polymers such as ABS graft polymers wherein the properties of the resulting polymers may be easily controlled during the production process.

SUMMARY OF THE INVENTION

The present methods for preparing graft polymers provide graft copolymers having improved thermal stability and/or improved color stability. The present methods for preparing graft polymers also produce graft polymers having reduced residual grafting monomer content.

The present invention provides a method utilizing a graft polymer latex which is coagulated with sulfurous acid. The resulting coagulated graft polymer latex exhibits improved thermal and color stability as a result of the use of the sulfurous acid. In a further embodiment of the present methods, the coagulation is effected in the presence of a radical initiator, whereby the amount of residual grafting monomer content in the graft polymer is reduced.

These and additional objects and advantages will be more fully apparent in view of the following detailed description.

DETAILED DESCRIPTION

According to the present invention, a graft polymer latex resulting from a conventional method of forming a graft polymer such as an ABS resin is coagulated with sulfurous acid. In a typical conventional method of forming graft polymers, one or more grafting monomers are emulsion polymerized in the presence of a rubber substrate, whereby the grafting monomers are copolymerized with one another and grafted to the rubber substrate. In the methods of the present invention, an aqueous latex resulting from such an emulsion polymerization process is coagulated with sulfurous acid.

More particularly, emulsion polymerization methods are well known in the art and generally include a soap or surfactant, a free radical initiator and a chain transfer agent in the emulsion polymerization medium. Examples of suitable soaps/surfactants include fatty acid soaps and especially water soluble, long chain fatty acid soaps such as sodium or potassium laureate, myristate, palmitate, oleate and stearate. Water soluble sodium or potassium soaps of tall oil and the rosin soaps, including disproportionate rosin soaps, may also be used. If desired, a secondary surfactant may be present, examples of which include alkali metal sulfonates derived from alkyl and/or aryl sulfonic acids such as sodium alkyl naphthalene sulfonate, and alkali metal alkyl sulfates such as sodium alkyl sulfates. Suitable free radical initiators include peroxides, including organic hydroperoxides and inorganic peroxides, azo compounds, and ionizable heavy metal salts. Suitable chain transfer agents include the well known mercaptan-type compounds. The grafting monomer mixture may be added all at once to the emulsion polymerization medium to allow formation of the graft polymer latex.

The graft polymer latex which is coagulated according to the present methods contains a graft polymer comprising a rubber substrate and a grafted portion. The rubber substrate is preferably formed from one or more conjugated diene monomers such butadiene, isoprene, 1,3-heptadiene, methyl-1,3-pentadiene, 2,3-dimethyl-1,3-butadiene, 2-ethyl-1,3-pentadiene, 1,3- and 2,4-hexadiene, chloro and bromo substituted butadienes, mixtures thereof and the like. In a preferred embodiment, the rubber substrate is selected from the group of rubbers consisting of polybutadiene, butadiene copolymers formed from butadiene and styrene, butadiene and one or more alkyl acrylates, or the like, polyisoprene, polychloroprene, and mixtures thereof. The rubber substrate is selected from the group of rubbers consisting of polybutadiene, butadiene copolymers formed from butadiene and styrene, butadiene and one or more alkyl acrylates, or the like, polyisoprene, polychloroprene, and mixtures thereof. The rubber substrate may be formed in accordance with any of the techniques known in the art. Conveniently, the rubber substrate may itself be formed by emulsion polymerization.

The grafted portion of the graft polymer is preferably formed from at least one monovinyl aromatic monomer.

Examples of suitable monovinyl aromatic monomers include, but are not limited to, styrene and substituted styrenes containing one or more substituents selected from halogen atoms, alkyl groups of from 1 to about 5 carbon atoms, cycloalkyl groups, aryl groups, alkaryl groups, arylalkyl groups, alkoxy groups and aryloxy groups. The substituents may be located on the aromatic ring and/or the vinyl portion of the monomers.

In a further embodiment, the grafted portion is formed from at least one monovinyl aromatic monomer (vinyl aromatic monomeric compound) and at least one additional ethylinically unsaturated monomer. The additional ethylinically unsaturated monomer may, for example, be an acrylic monomer such as acrylonitrile, methylacrylonitrile, an alkyl acrylate, an alkyl methacrylate, or mixtures thereof. Additionally, the ethylinically unsaturated monomer may comprise maleic anhydride, maleimide, a substituted maleimide, for example, an N-substituted maleimide, mixtures thereof and the like. In a preferred embodiment, the grafted portion is formed from at least one monovinyl aromatic monomer and at least one vinyl cyanide monomer (vinyl cyanide monomeric compound) such as acrylonitrile.

The graft copolymer contained in the latex suitably comprises at least about 20 weight percent of the rubber substrate, and more preferably at least about 40 weight percent of the rubber substrate. Additionally, the grafted portion is preferably formed from an equal or greater amount of monovinyl aromatic monomer, as compared with any additional ethylinically unsaturated monomers included therein. Preferably, when the grafted portion is formed from at least one additional ethylinically unsaturated monomer, the weight ratio of the monovinyl aromatic monomer and the ethylinically unsaturated monomers is at least about 3:1.

In accordance with the methods of the present invention, the resulting aqueous graft polymer latex is contacted with sulfurous acid in order to coagulate the latex. The sulfurous acid is employed in an amount sufficient to improve the color and thermal stability of the resulting graft polymer. Conveniently, the sulfurous acid is formed by saturating water with sulfur dioxide. Since the latex resulting from polymerization may be at an elevated temperature, the coagulation may be effected at an elevated temperature, for example greater than about 50° C., and preferably greater than about 80° C. Once the graft polymer latex is coagulated, the latex may be filtered, followed by optional washing of the resulting solids, and drying to produce a dry polymer product.

In a further embodiment of the present methods, the coagulation may be effected in the presence of a radical initiator. The present inventor has determined that this step reduces the residual grafting monomer concentration, particularly the residual monovinyl aromatic monomer concentration, in the resin product. Radical initiators are well known in the art and many of the conventional initiators may be employed. Examples of radical initiators suitable for use in the present invention include, but are not limited to, peroxide initiators, for example organic peroxides such as benzoyl peroxide and dicumyl peroxide, and inorganic peroxides such as potassium persulfate, $K_2S_2O$, azo initiators, for example 2,2'-azobisisobutyronitrile (AIBN), 2,2'azobis-2-methylbutyronitrile and the like, and redox initiators. As is demonstrated in Example 2, a preferred radical initiator for use in the present methods comprises potassium persulfate.

The radial initiator is employed in an amount sufficient to reduce the residual grafting monomer concentration in the graft polymer product. Preferably, the radical initiator, when employed, is included in the latex in an amount of from about 0.01 to about 5 parts by weight per 100 parts by weight of the graft polymer, and more preferably in an amount from about 0.05 to about 1 part by weight per 100 parts by weight of the graft polymer.

When the radical initiator is added to the latex of vinyl aromatic—vinyl cyanide—rubber graft copolymer, the residual level of vinyl aromatic compound (such as styrene) is reduced to a level of less than 100 parts per million (ppm) based on the total weight of the composition, more preferably to less than 80 ppm, and most preferably less than 60 ppm.

The resulting graft polymers may be employed in a variety of molding applications, alone or in blend compositions with one or more additional thermoplastic polymers as is well known in the art. Additionally, the graft polymers may be provided with one or more additives known in the art, including, but not limited to, lubricants, stabilizers, fire and flame retardants, fillers, reinforcing agents, antistatic agents, antioxidants, and the like.

The present method may also be set out as involving a method for producing a vinyl aromatic—vinyl cyanide—rubber graft copolymer composition exhibiting enhanced whiteness, involving (a) emulsion polymerizing a vinyl aromatic monomeric compound and a vinyl cyanide monomeric compound in the presence of a rubber latex to produce a latex of vinyl aromatic—vinyl cyanide—rubber graft copolymer, (b) coagulating the graft copolymer latex with sulfurous acid to produce a coagulated latex, (c) filtering the coagulated latex to separate water from the graft copolymer to produce a graft copolymer concentrate, and (d) drying the graft copolymer concentrate to produce the graft copolymer composition. The present process is also useful for coagulating vinyl aromatic-vinyl cyanide copolymer latex.

The present methods and graft polymers resulting therefrom are demonstrated in the following examples. Throughout the examples and the present specification, reference to parts and percentages are by weight unless otherwise specified.

EXAMPLE 1

An ABS graft polymer latex formed by emulsion polymerization of a polybutadiene substrate and grafting monomers comprising styrene and acrylonitrile in an approximate 3:1 weight ratio was employed. The ABS latex was coagulated at 190° F. (87.8° C.) in water saturated with sulfur dioxide gas from a small lecture bottle. For comparison purposes, a sample of the same ABS graft polymer latex was coagulated with sulfuric acid ($H_2SO_4$) at 190° F. The coagulated polymer latices were then filtered and air dried to produce a dry polymer product. Samples of each product were subjected to measurement of thermal oxidative stability using isodifferential scanning calorimetry in which the time of stability was measured in minutes. Samples of the products were also exposed to a temperature of 200° C. in air for ten minutes and observed for color stability. The results of these test are set forth in Table I.

TABLE I

| Coagulant | 190° C. iso-DSC Stability time (min.) | Color after 10 min. at 200° C. in Air |
|---|---|---|
| Sulfuric acid (Comparison) | 107.4 | beige (after 4 min.) |
| Sulfurous acid (Invention) | 131.9 | white |

The results set forth in Table I demonstrate that the product prepared according to the present method exhibited improved thermal oxidative stability and improved color stability as compared with the polymer produced according to the comparative method.

EXAMPLE 2

This example employed the same ABS graft polymer latex described in Example 1. In a first step, 0.2 parts by weight potassium persulfate (PPS) was added to the latex per 100 parts by weight of the graft polymer. A first sample of the latex containing the potassium persulfate initiator was coagulated 190° F. in water saturated with sulfur dioxide gas from a small lecture bottle. For comparison purposes, a second sample was coagulated at 190° F. with sulfuric acid. Samples of the resulting coagulated polymer latices were then filtered and air dried in the manner described in Example 1. Samples of the dry polymer products were analyzed for thermal oxidative stability and color stability in the manner described in Example 1. Samples of the products, and samples of the products from Example 1, were also analyzed for residual styrene monomer. The results of these measurements are set forth in Table II.

TABLE II

| Coagulant | PPS pbw | Residual Styrene ppm-Dry | 190° C. iso-DSC (min.) | Color after 10 min. at 200° C. in Air |
|---|---|---|---|---|
| Sulfuric acid | — | 250 | 107 | beige (after 4 min.) |
| Sulfuric acid | 0.2 | 162 | 99 | beige (after 4 min.) |
| Sulfurous acid | — | 212 | 132 | white |
| Sulfurous acid | 0.2 | 56 | 129 | white |

The results set forth in Table II demonstrate that the method according to the present invention employing sulfurous acid as the coagulant provides the resulting polymer product with improved thermal oxidative stability and improved color stability. Additionally, the inclusion of the radical initiator in the latex results in significantly reduced residual styrene grafting monomer in the polymer product. While the radical initiator together with sulfuric acid reduce the residual styrene concentration, and the sulfurous acid alone, without the radical initiator, reduced the residual styrene concentration, the method according to the present invention employing the radical initiator and the sulfurous acid coagulant together provided a significantly greater reduction in the residual styrene concentration.

The preceding examples are set forth to illustrate specific embodiments of the invention and are not intended to limit the methods and products of the present invention. Additional embodiments and advantages within the scope of the claimed invention will be apparent to one of ordinary skill in the art.

What is claimed is:

1. A method for coagulating a graft polymer latex, said graft polymer latex having been formed by emulsion polymerization of one or more monomers, said one or more monomers comprising at least one monovinyl aromatic monomer, in the presence of a rubber substrate, comprising contacting the graft polymer latex with sulfurous acid.

2. A method as defined by claim 1, wherein the sulfurous acid is formed by saturating water with sulfur dioxide.

3. A method as defined by claim 1, wherein the rubber substrate is selected from the group consisting of polybutadiene, butadiene-styrene copolymers, butadiene-alkyl acrylate copolymers, polyisoprene, polychloroprene and mixtures thereof.

4. A method as defined by claim 1, wherein the graft polymer comprises at least about 40 weight percent of the rubber substrate.

5. A method as defined by claim 1, wherein the contacting step is conducted at a temperature greater than about 50° C.

6. A method as defined by claim 5, wherein the contacting step is conducted at a temperature greater than about 80° C.

7. A method as defined by claim 1, further comprising filtering the coagulated latex and drying the resulting solids.

8. A method as defined in claim 1, wherein the coagulation is effected in the presence of a radical initiator.

9. A method for coagulating a graft polymer latex, said graft polymer latex having been formed by emulsion polymerization of styrene and acrylonitrile in the presence of a polybutadiene substrate, comprising contacting the graft polymer latex with sulfurous acid.

* * * * *